(12) United States Patent
Pampagnin

(10) Patent No.: US 9,305,143 B2
(45) Date of Patent: Apr. 5, 2016

(54) BROADCASTING OF ELECTRONIC DOCUMENTS PRESERVING COPYRIGHT AND PERMITTING PRIVATE COPYING

(71) Applicant: Noel Pampagnin, Joinville le Pont (FR)

(72) Inventor: Noel Pampagnin, Joinville le Pont (FR)

( * ) Notice: Subject to any disclaimer, the term of this patent is extended or adjusted under 35 U.S.C. 154(b) by 635 days.

(21) Appl. No.: 13/846,388

(22) Filed: Mar. 18, 2013

(65) Prior Publication Data

US 2013/0212706 A1    Aug. 15, 2013

Related U.S. Application Data

(63) Continuation of application No. 12/302,195, filed as application No. PCT/FR2007/000844 on May 18, 2007, now abandoned.

(30) Foreign Application Priority Data

May 24, 2006    (FR) ...................................... 06 04653

(51) Int. Cl.
*G06F 21/10*    (2013.01)
*G06Q 30/06*    (2012.01)
*H04L 29/06*    (2006.01)

(52) U.S. Cl.
CPC ............ *G06F 21/10* (2013.01); *G06Q 30/0601* (2013.01); *H04L 63/06* (2013.01); *H04L 63/10* (2013.01)

(58) Field of Classification Search
CPC ..................................................... G06F 21/10
See application file for complete search history.

(56) References Cited

U.S. PATENT DOCUMENTS

| 7,047,411 | B1 | 5/2006 | DeMello et al. | |
|---|---|---|---|---|
| 2002/0077986 | A1* | 6/2002 | Kobata et al. | 705/52 |
| 2005/0262089 | A1* | 11/2005 | Wu | 707/10 |
| 2007/0100768 | A1* | 5/2007 | Boccon-Gibod et al. | 705/59 |
| 2007/0185814 | A1* | 8/2007 | Boccon-Gibod et al. | 705/51 |

FOREIGN PATENT DOCUMENTS

| WO | 01/44908 | 6/2001 |
|---|---|---|
| WO | 01/98903 | 12/2001 |

* cited by examiner

*Primary Examiner* — Jacob C. Coppola
(74) *Attorney, Agent, or Firm* — Young & Thompson

(57) ABSTRACT

A method of broadcasting electronic documents allowing the protection of copyright and private copying includes a network accessible control server taking customer orders, network accessible delivery and control servers, and equipment supporting a display for consulting the document. Each document copy is generated by the delivery server based on the document model ordered. A controller verifies digital rights in force at consultation time, and contains other digital rights acquired by the customer. Copy generation is triggered by the customer activating a URL link to the delivery server. This link was previously sent to the customer via electronic messaging by the order server, containing at least the unique identifier of the copy ordered. The copy is loaded onto the customer's equipment on completion of generation and can be consulted only after issuing a request to the control server containing the unique identifier, and the receipt of the response permitting consultation.

18 Claims, 4 Drawing Sheets

Figure 1:
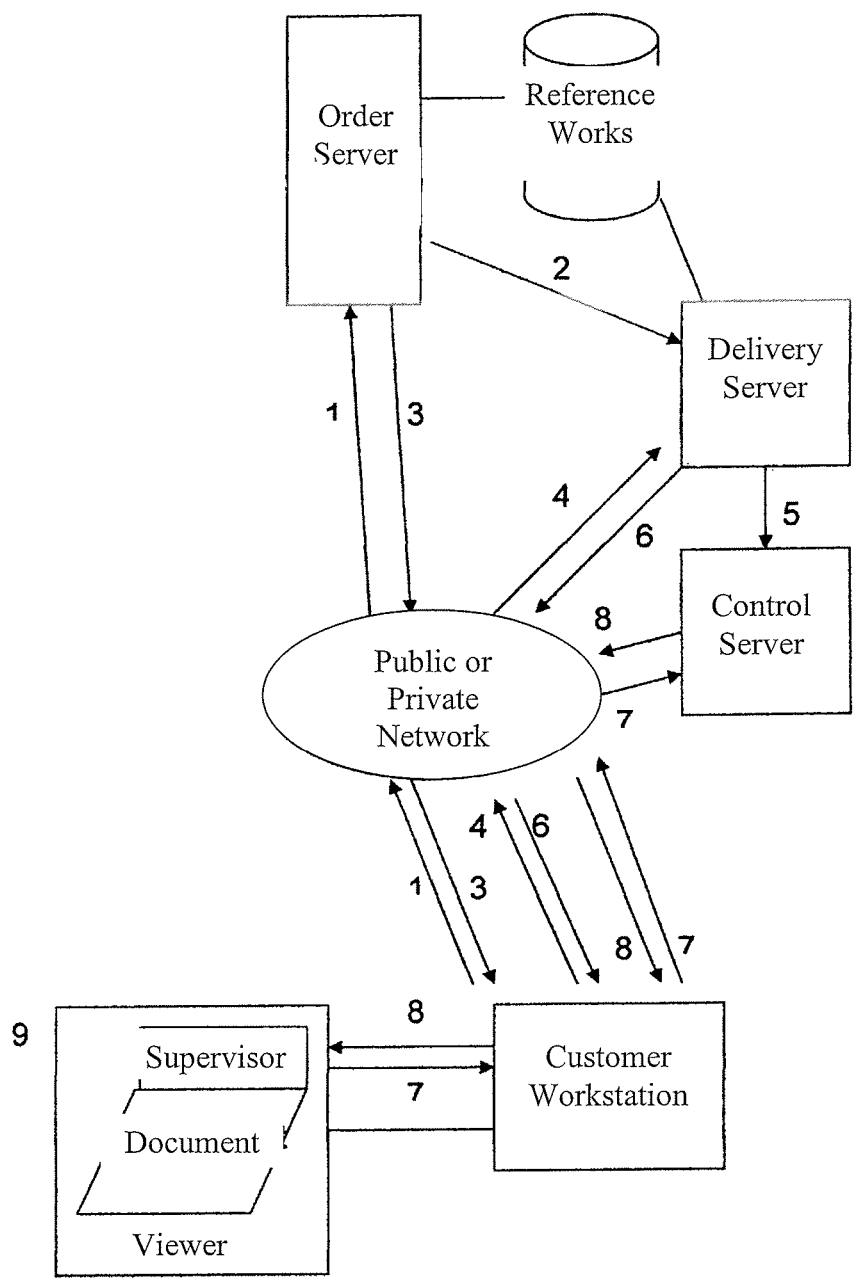

BROADCASTING OF ELECTRONIC DOCUMENTS PRESERVING COPYRIGHT AND PERMITTING PRIVATE COPYING

TECHNICAL DOMAIN OF THE INVENTION

Distribution of electronic documents for the general public, on physical medium, or by public or private telecommunication network.

STATE-OF-THE-ART, PROBLEM POSED

Literary works, or more simply studies or other documents with which copyrights are associated can be offered to the public in new forms, in addition to traditional paper printing. These new forms are electronic documents delivered in various standard formats such as PDF (Portable Document Format) from Adobe Systems or LIT from Microsoft. Each of these companies provides a free viewer which enables the reading of such documents on, according to the case, desktop computers, portable computers, personal digital assistants, mobile phones and more generally on all types of devices comprising a processor, permanent memory and supporting the programs.

Since these documents, delivered on physical media such as CD-ROM, or downloaded from the private or public network like the Internet are in electronic form, they are easily and infinitely copyable to the detriment of the legitimate copyrights.

To guarantee the copyrights, the companies originating the reading formats have associated digital rights to the documents which specify the actions permitted on the documents, like permission to print, make copies, add annotations, etc. These actions are managed by a rights server which delivers a copy of the document and its rights to the customer on one or a plurality of machines in limited number. Subsequently, the customer may not make another copy on another machine, even if it involves a private copy.

The present invention enables the customer who bought a document on CD-ROM, or by the Internet, to consult it on an arbitrary machine supporting the format of the chosen reader, and make as many private copies as desired, without that's threatening the legitimate copyrights.

THE INVENTION

The use that a reader may make of an electronic document is not the same as for a printed document. For a new concept, a new usage. It is not useful for an electronic document to replace a printed document in all its functions. One must instead imagine that an electronic document adds functions to the printed form, which remains the reference form, and the preferred archival form. In contrast, the downloadable and less costly electronic form can enable an immediate and easy consultation of the documents at home, and the documents can be stored in a small space.

But the acquisition of documents in electronic form for a modest cost must not threaten the copyrights. To do this, and it is the subject of the invention, each document downloaded (or delivered on CD-ROM) must contain the permanently acquired digital rights, like the right to print, a unique identifier, and a management agent managing the controlled consultation rights. This agent, for example, must enable opening the document some number of times per day, during a given period. Outside of these constraints, the document is not readable.

In order to confirm the rights associated with the document, this agent, named the supervision or supervisor agent, is added to each copy of the document. Upon each opening of the document, or by the selection of a particular object, such as an icon, this agent connects to a control server through a public or private network and provides it at least its unique identifier in encrypted form, and other control information if needed. In return, the server sends it a positive acknowledgment in encrypted form, if the document can be consulted. In the absence of this positive acknowledgment, the document cannot be consulted. The use of encrypted or masked data during the exchanges is indispensable for avoiding the usurping of the control server by a pirate server.

It can be clearly seen that this type of document can be recopied infinitely without threatening the rights of the author, because in any case, this document and all its copies having the same unique identifier will be seen as a single document by the control server. Reading them will therefore be conditional upon recording of all the accesses to the control server done by the original document and by all its copies. This method therefore enables private copying. Further, the transfer of the document to a third party only threatens the consultation rights acquired by the customer, and not the rights of the author.

The supervision agent of each electronic document is added to the customer's copy during the generation by a delivery server of said copy starting from the model of the original document. To do this, a library is used for creation of documents "on the fly", where the programming interface provided by the companies, authors the electronic document standard formats. The assembly, agent plus document, is sealed and protected by encryption mechanisms corresponding to the state-of-the-art, provided by the companies named above, such as Adobe Systems or Microsoft.

The digital rights permanently acquired by the customer are also included in the document that is created by the delivery server, as a function of the customer's choices, and the sales policy of the distributor. One can imagine a different order, with a different price for different rights: printing, copying, etc. rights.

Further, the sales price can take into account a longer or shorter period for consultation of the document, a longer or shorter daily consultation frequency, etc. These last criteria, which constitute digital rights controlled by the control server, together with the unique identifier of the document, are sent to the control server by the delivery server after generation of the customer copy.

This leads us to bring up the first element of the chain, which is the order server, in the case of downloadable documents. In the case of generation of documents on physical medium, there is no order server, because there is no order. The documents are generated by the delivery server with a unique identifier, without an order identifier.

This order server could be an http server, if it is accessible by Internet or intranet, and contain model documents to be distributed, an item database with, in particular, the prices, a customer database with the electronic messaging address of the customer and as needed, the identities and contact information of the customers, and an order database containing in particular the references of the works ordered. After agreement on the sales transaction between the customer and the distributor, for example after a valid payment by bankcard giving the right to consult a work from the database, a delivery record of the document ordered is created on the delivery server, and then a message containing a link to the delivery server is sent to the customer, for example by electronic messaging.

The activation of this link by the customer triggers the generation of the specific copy intended for the customer based on the generic model of the document. This copy could contain a first page reviewing the identity and contact information of the customer, together with the consultation rights and the other digital rights that were acquired. At the end of the generation, a control record is created on the control server, containing at least the unique identifier of said copy, and other criteria such as the period of consultation and the daily consultation frequency. The document is next downloaded on the customer's machine, and the customer will have the opportunity of backing-up said document when the end-of-transfer message appears. The document thus supplemented and correctly received by the customer can only be generated one time but private copying can be done at any time.

The document can be consulted only within the constraints negotiated between the customer and the distributor at the time of the order on any machine supporting the chosen format and having access to the Internet, intranet or any other network as appropriate, which enables verification by the control server of the rights acquired by the customer concerning the digital work. At the end of the negotiated period, it can no longer be consulted at all.

Of course, the http server presenting the documents on the Internet, the order server, the delivery server and the control server can be supported by the same machine or by various machines.

In the case of delivery of documents on physical media, there is no http server, and no order server. There is only a delivery server and a control server.

THE DRAWINGS

FIG. 1/4

The most general sequencing of the actions for an order of a digital work through the Internet is described in FIG. 1/4.

1—The customer accesses the http order server, chooses their work in the reference database of works, and orders it.

2—The order server sends the order information to the delivery server, comprising at least the reference to the work, the customer contact information, the controllable consultation rights, and the other digital rights ordered.

3—The order server response to the customer's order by sending them, for example, by electronic messaging, a link towards the delivery server, comprising as a parameter at least the unique identifier of the copy ordered.

4—The customer activates this link, which causes the generation by the delivery server of a specific copy of the work ordered, containing the supervision agent for the document, and the other permanently acquired digital rights relating to the document, like the authorization to print or copy.

5—The delivery server sends the control information to the control server, including at least the unique identifier of said copy, and criteria such as the consultation period and the daily consultation frequency.

6—This specific copy generated by the delivery server is next downloaded to the customer station, and is then stored on the customer station. The customer can make a private copy of it then or later. Each copy contains the same unique identifier and the supervision agent.

7—In order for consultation, said copy sends a specific query, containing at least its unique identifier, through the public or private network to the control server.

8—In response, the control server returns to the customer workstation the authorization to consult said copy, or a consultation refusal, according to the current rights concerning the work acquired by the customer.

9—The document can be consulted or not in the viewer chosen by the customer.

FIG. 2/4

Reading of the document with verification of the rights

7—The controller of the document sends a query containing at least its unique identifier towards the control server, through a public or private telecommunications network.

8—In response, the control server returns to the customer workstation the authorization to consult this specific copy, or a consultation refusal according to the current consultation rights concerning the copy acquired by the customer.

9—The document can be consulted or not in the viewer chosen by the customer.

FIG. 3/4

Same general process as FIG. 1/4, but the order, delivery and control servers are supported by the same machine.

FIG. 4/4

Generation of documents for physical media such as CD-ROM.

10—Bulk generation of the documents from the models of works by the delivery server. Each document generated contains an integrated, supervision agent, the permanent digital rights, and at least one unique identifier.

5—Sending the control information concerning each managed document, in particular the unique identifier, the consultation period and the daily consultation frequency to the control server by the delivery server.

11—Recording on physical medium of the documents generated.

Figure 2:
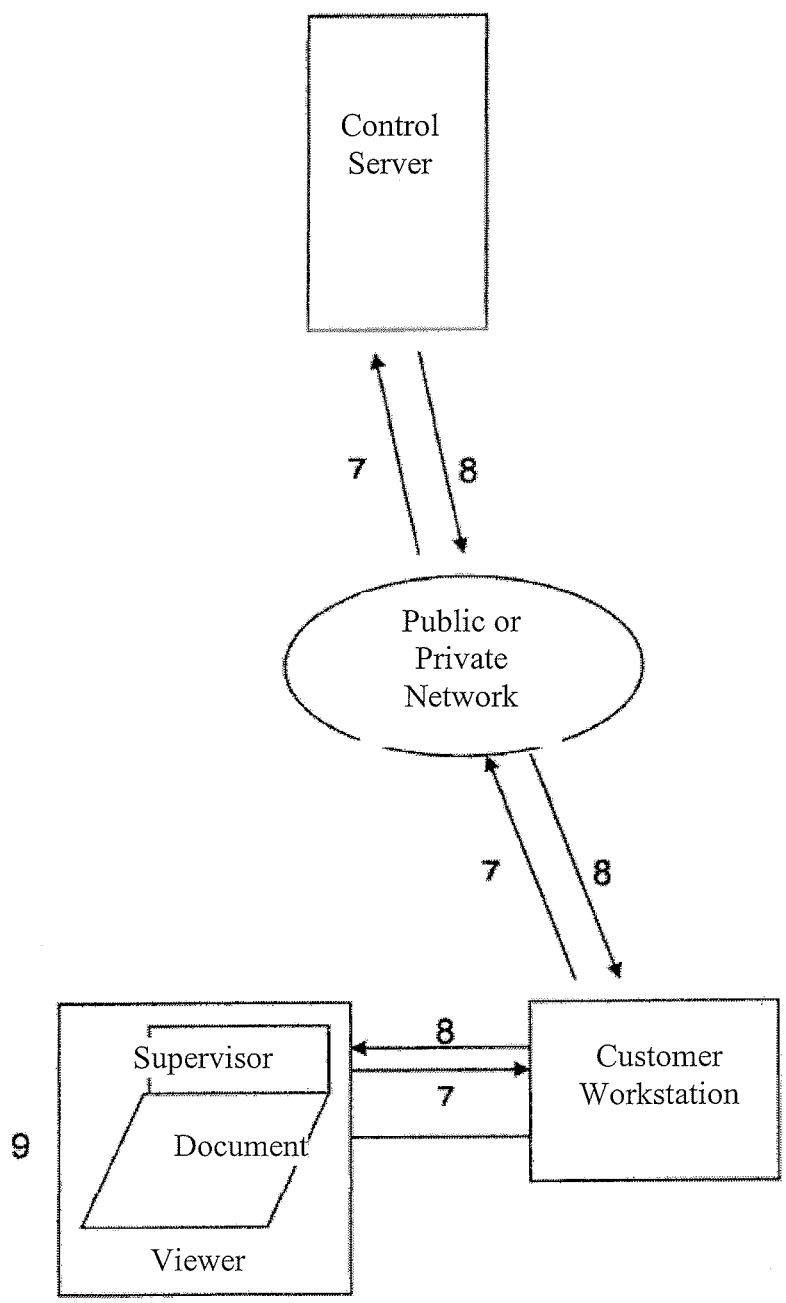
Figure 3:
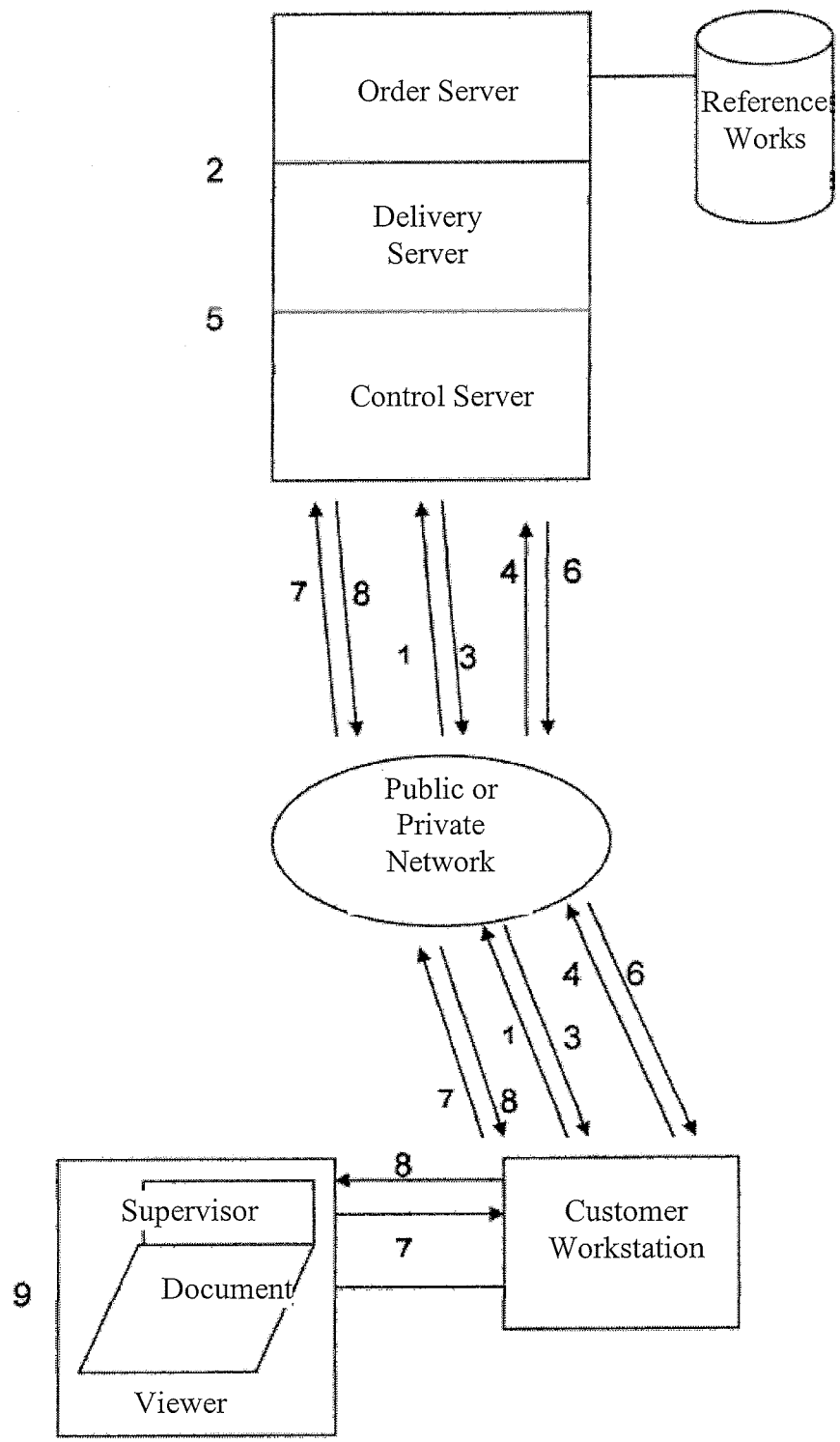
Figure 4:
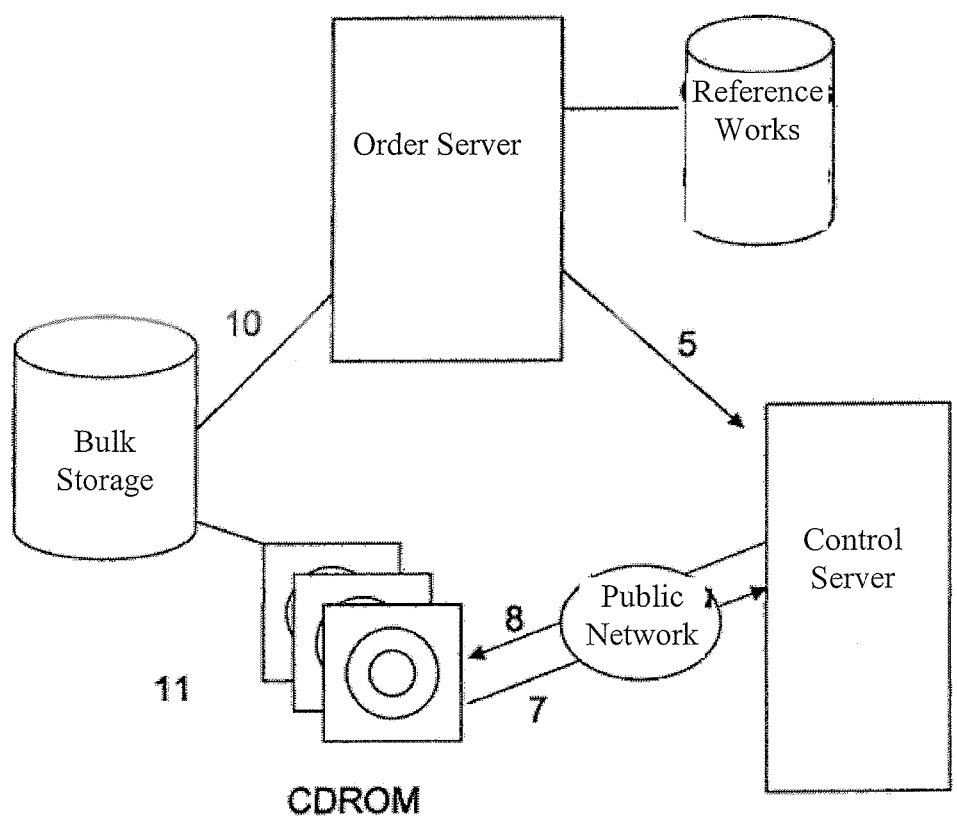

7, 8—Reading by the customer workstation of the documents generated after verification of the consultation rights by the control server, according to the procedure described by FIG. 2/4.

AN EMBODIMENT OF THE METHOD

General Organization

The electronic document creation method which enables the protection of the copyrights and private copying comprises: an order server for the handling of orders by the customers (1) accessible from a private or public network such as the Internet; a delivery server accessible from the same network, for generating the specific copy ordered by the customer; a control server accessible on the same network, intended to verify the digital rights acquired by the customer; an desktop computer, a portable computer, a personal digital assistant, or any other equipment supporting one viewer among the at least two viewers from the market, intended to consult the document. Said copy of each document is generated by the delivery server from the model of the ordered document (1) and the ordered digital rights (1) transmitted by the order server (2). It contains a supervision (or supervisor) agent intended to verify, at the moment of the consultation, the current rights, stored in the control server (5). Said copy also contains the other digital rights permanently acquired by the customer and not subsequently verified The generation of said copy is triggered by the customer (4), by activation of a URL link to the delivery server containing at least the unique identifier of the ordered copy. This link was previously sent to the customer (3) by the order server via electronic messaging, or any other means. Said copy is loaded on the customer's equipment at the end of the generation (6) and can be backed up several times by private copying. Said copy, or its duplicates, can only be consulted after sending a query containing the unique identifier of said copy, sent by the supervision agent towards the control server (7), and receiving the response authorizing the consultation (8).

The method can be performed with the order, delivery and control servers supported by a single machine.

The method is applicable if it comprises only one delivery server intended for the mass production of digital works on physical media from document models and digital rights, and a control server intended to control the controlled digital rights attached to each copy by the delivery server, and verified on each digital work consultation.

The response of the control server can be a simple positive acknowledgment (8).

The response of the control server can contain a set of digital rights applicable to the ordered copy (8).

Generation of the Copy Ordered by the Customer

A generation program is supported by the delivery server which generates the copy of the work ordered by the customer (6) from the model of the ordered document and the ordered rights (2). Said program integrates with the copy a supervision agent managing the controlled digital rights like the period authorized for the consultation, the daily frequency of consultation, the total number of consultations, etc. and the set of uncontrolled digital rights acquired by the customer like the authorization to print, copy, etc. The set is sealed and cannot be modified. Said program generates the control record of the ordered copy and stores it on the control server (5).

This program can add a text to the generated copy reviewing the identity and references of the acquirer of the copy of the work, and optionally the rights acquired by the acquirer.

Supervision Agent

A supervision agent is integrated with each copy of the document generated. It is a program which authorizes or refuses the consultation of said copy, by means of sending a query containing at least one unique identifier of the copy (7) to the control server via the public or private network. The response from the control server authorizing or refusing the consultation of copy (8) is handled by said agent, which discloses the content of the document or not.

Control Server

The control server supports a control program which generates a positive or negative response (8) to the requests from the copies identified by their unique identifier (7), according to the current digital rights concerning said documents, for example the authorized period for the consultation, the daily frequency of consultation, the total number of consultations, etc.

This control program can generate additionally a document reviewing the current rights relative to the copy, and potentially the contact information of the acquirer, sent to the customer workstation with the response to the query from said copy.

The invention claimed is:

1. An electronic document creation method protecting copyrights and allowing private copying, comprising the steps of:

accessing an order server containing models of documents to distribute, an item database, a customer database with the emails of customers, an order database containing references of the works ordered, and digital rights associated with the works ordered, said digital rights comprising controlled consultation rights as constraints, and permanently acquired digital rights, the order server configured for handling an order received from the customer on the network;

accessing a delivery server via the network, the delivery server configured for generating a specific copy of a document ordered by a customer from the model of the document ordered, the order server sending order information to the delivery server, the order information comprising at least the reference to the work, customer contact information, the controllable consultation rights, and other digital rights ordered, the delivery server creating a delivery record of the work ordered containing the unique identifier to control the said work ordered, the order server responding to the customer's order by sending the customer a URL link towards the delivery server, the URL link comprising, as a parameter, at least the unique identifier of the copy ordered;

responsive to an activation of the URL link by the customer, the delivery server generating a specific copy of the work ordered, by a library used for creation of documents on the fly containing the unique identifier, a supervision agent for the document, and the other permanently acquired digital rights relating to the document, the supervision agent designed to verify the controlled digital rights of each copy of the ordered work;

accessing a control server via the network, the control server configured to verify digital rights acquired by the customer using the unique identifier of the ordered document copy;

when delivering the ordered document copy to the customer, the delivery server sending to the control server the controlled information containing at least the unique identifier of the ordered document copy and the set of digital rights controlled; and operating a customer computing device, supporting a viewer, to allow the customer, via the viewer, to consult the ordered document, previously downloaded from the delivery server, said viewer designed to allow the customer to consult the ordered document; and a verification step comprising the sub-steps of when opening the specific copy on the customer computing device, the supervision agent of the specific copy causing the customer computing device to connect to the control server, and the supervision agent of the specific copy sending a query containing at least the unique identifier of the specific copy, in response to receiving the query, the control server returning a response comprised of one of i) an authorization to consult the specific copy, and ii) a consultation refusal, according to the specific copy's controlled digital rights as stored by the control server, and when the customer computing device receives the response from the control server, the supervision agent of the specific copy allowing the consultation of the specific copy when the response comprises the authorization to consult the specific copy and prohibiting the consultation of the specific copy when the response comprises the consultation refusal.

2. The method according to claim 1, comprising the further step of the customer computing device making a back-up private copy of the specific copy, the back-up copy of the specific copy comprising the unique identifier and the supervision agent.

3. The method according to claim 1, wherein the order server, the delivery server, and the control server are supported by a single machine.

4. The method according to claim 1, wherein,
said delivery server generates the specific document copy on a physical media from document models and digital rights, and
the control server controls the controlled digital rights attached to each specific document copy on the physical media, and verifies each consultation of each specific document copy on the physical media.

5. The method according to claim 1, wherein the response of the control server made in response to receiving the query, is a simple positive acknowledgment.

6. The method according to claim 1, wherein the response of the control server made in response to receiving the query, comprises a set of specific digital rights applicable to the specific copy.

7. The method according to claim 1, comprising the further step of the delivery server adding a text to the generated specific document copy, the added text reviewing the identity and references of the acquirer of the copy of the work.

8. The method according to claim 7, wherein the text further comprises rights acquired by the acquirer.

9. The method according to claim 1, comprising a further step of the control server additionally generating a document reviewing current rights relative to the specific copy.

10. The method according to claim 9, wherein the document reviewing the current right further comprises contact information of the acquirer.

11. The method according to claim 9, comprising the further step of the control server sending to the customer computing device with the response to the query from the supervision agent, the document reviewing the current rights.

12. The method according to claim 1, wherein in said step of the deliver server generating the specific document copy of the chosen digital work ordered by the customer order, the generated document copy is sealed and cannot be modified.

13. The method according to claim 1, wherein said verification step comprises encrypted exchanges between the supervision agent and the control server in sending and responding to the query.

14. The method according to claim 1, wherein,
the constraints of the controllable digital consultation rights include any of a period authorized for document consultation, a daily frequency of consultation, and a total number of consultations.

15. The electronic document broadcasting method of claim 14, wherein the order information sent to the delivery server by the order server further comprises an additional data including customer contact information.

16. The method according to claim 1, wherein,
the permanently acquired digital rights including at least one of printing or copying the document.

17. The method according to claim 1, wherein,
the customer computing device is one of i) a computer, ii) a personal assistant, and iii) any equipment supporting the viewer intended for customer consultation of the ordered document, and
said viewer having access to the network.

18. An electronic document creation method protecting copyrights and allowing private copying, comprising the steps of:
accessing an order server via a network, the order server configured for the handling of an order received from a customer on the network, the order server containing models of documents to distribute, an item database, a customer database with the emails of customers, an order database containing references of the works ordered, and digital rights associated with the works ordered, said digital rights comprising controlled consultation rights as constraints, and permanently acquired digital rights;
accessing a delivery server via the network, the delivery server configured for generating a specific copy of a document ordered by the customer from the model of the document ordered, the order server sending order information to the delivery server, the order information comprising at least the reference to the work, customer contact information, the controllable consultation rights, and other digital rights ordered,
the delivery server creating a delivery record of the work ordered containing the unique identifier to control the said work ordered
responsive to the order from the customer, the order server sending the customer a URL link towards the delivery server, the URL link comprising, as a parameter, at least the unique identifier of the copy ordered;
responsive to activation of the URL link by the customer, the delivery server generating a specific copy of the work ordered, by a library used for creation of documents on the fly containing the unique identifier, a supervision agent for the document, and the other permanently acquired digital rights relating to the document, the supervision agent designed to verify the controlled digital rights of each copy of the ordered work;
accessing a control server via the network, the control server configured to verify digital rights acquired by the customer using the unique identifier of the ordered document copy;
the delivery server sending to the control server, after the delivery of the ordered document copy to the customer, the controlled information containing at least the unique identifier of the ordered document copy and the set of digital rights controlled; and
operating a customer computing device, supporting a viewer, to allow the customer, via the viewer intended to consult the ordered document, downloaded from the delivery server, said viewer having access to the network; and
a verification step comprising the sub-steps of
when opening the specific copy on the customer computing device, the supervision agent of the specific copy causing the customer computing device to connect to the control server and the supervision agent of the specific copy sends a query containing at least the unique identifier of the specific copy,
in response to receiving the query, the control server returning a response comprised of one of i) an authorization to consult the specific copy, and ii) a consultation refusal, according to the specific copy's controlled digital rights as stored by the control server, and
when the customer computing device receives the response from the control server, the supervision agent of the specific copy allowing the consultation of the specific copy when the response comprises the authorization to consult the specific copy and prohibiting the consultation of the specific copy when the response comprises the consultation refusal.

* * * * *